United States Patent
Johnson

(10) Patent No.: US 10,752,155 B2
(45) Date of Patent: Aug. 25, 2020

(54) MODULAR TRUCK BED MOUNTING APPARATUS AND KIT THEREFOR

(71) Applicant: Corey B. Johnson, Hyrum, UT (US)

(72) Inventor: Corey B. Johnson, Hyrum, UT (US)

(*) Notice: Subject to any disclaimer, the term of this patent is extended or adjusted under 35 U.S.C. 154(b) by 0 days.

(21) Appl. No.: 15/982,696

(22) Filed: May 17, 2018

(65) Prior Publication Data
US 2018/0264988 A1 Sep. 20, 2018

Related U.S. Application Data

(63) Continuation-in-part of application No. 15/598,250, filed on May 17, 2017.

(60) Provisional application No. 62/508,779, filed on May 19, 2017, provisional application No. 62/508,761, filed on May 19, 2017.

(51) Int. Cl.
| | |
|---|---|
| *B60P 7/08* | (2006.01) |
| *B60P 3/077* | (2006.01) |
| *B62D 33/02* | (2006.01) |
| *B60P 3/06* | (2006.01) |
| *B62H 3/08* | (2006.01) |
| *B60P 3/079* | (2006.01) |
| *B62H 3/02* | (2006.01) |
| *B60T 3/00* | (2006.01) |
| *B60P 3/073* | (2006.01) |
| *B60R 5/02* | (2006.01) |
| *B60R 5/04* | (2006.01) |
| *B60P 3/07* | (2006.01) |
| *B60R 9/06* | (2006.01) |
| *B60P 3/075* | (2006.01) |
| *B60R 9/08* | (2006.01) |
| *B60R 9/10* | (2006.01) |

(52) U.S. Cl.
CPC ............... *B60P 7/0815* (2013.01); *B60P 3/06* (2013.01); *B60P 3/07* (2013.01); *B60P 3/073* (2013.01); *B60P 3/075* (2013.01); *B60P 3/077* (2013.01); *B60P 3/079* (2013.01); *B60P 7/0892* (2013.01); *B60R 5/02* (2013.01); *B60R 5/04* (2013.01); *B60R 9/065* (2013.01); *B60R 9/08* (2013.01); *B60R 9/10* (2013.01); *B60T 3/00* (2013.01); *B62D 33/02* (2013.01); *B62D 33/0207* (2013.01); *B62H 3/02* (2013.01); *B62H 3/08* (2013.01)

(58) Field of Classification Search
CPC ........... B60P 7/0815; B60P 3/073; B60P 3/07; B60P 3/075; B60P 7/0892; B60P 3/06; B60P 3/079; B60P 3/077; B60R 9/08; B60R 9/10; B60R 5/02; B60R 5/04; B60R 9/065; B62D 33/02; B62D 33/0207; B62H 3/08; B62H 3/02; B60T 3/00
USPC ............... 410/2–4, 7–12, 19–23, 30, 49, 50; 211/19–20, 23–24; 188/32
See application file for complete search history.

(56) References Cited

U.S. PATENT DOCUMENTS

| | | | |
|---|---|---|---|
| 5,971,685 A | 10/1999 | Owens | 410/151 |
| 6,675,980 B2 | 1/2004 | Ehrgott | 211/189 |
| 6,729,485 B2 | 5/2004 | Ehrgott | 211/189 |

(Continued)

*Primary Examiner* — Stephen T Gordon
(74) *Attorney, Agent, or Firm* — Michael R. Schramm

(57) ABSTRACT

The present invention is modular truck bed mounting apparatus and kit therefor. The apparatus comprises a length of E-track, a first tube, a plurality of second tubes, and a plurality of fasteners. The apparatus is preferably mounted to the head wall of a pickup truck bed and is useful in quickly and easily securing objects thereto.

15 Claims, 4 Drawing Sheets

(56) References Cited

U.S. PATENT DOCUMENTS

| | | | |
|---|---|---|---|
| 7,014,398 B1* | 3/2006 | Hellwig | B60P 3/075 410/19 |
| 8,028,845 B2 | 10/2011 | Himes | 211/103 |
| 8,439,612 B2 | 5/2013 | Chamoun | 410/121 |
| 8,690,503 B2 | 4/2014 | Chamoun | 410/121 |
| 9,346,392 B1 | 5/2016 | Neal et al. | B60P 7/0815 |
| 10,569,689 B2* | 2/2020 | Johnson | B60P 3/07 |
| 2002/0117464 A1 | 8/2002 | Ehrgott | 211/189 |
| 2002/0117465 A1 | 8/2002 | Ehrgott | 211/189 |
| 2008/0185489 A1 | 8/2008 | Ehrgott | 248/224.7 |
| 2009/0120888 A1 | 5/2009 | Himes | 211/103 |
| 2012/0257943 A1 | 10/2012 | Chamoun | 410/122 |
| 2014/0360957 A1 | 12/2014 | Himes | B60P 7/0815 |
| 2016/0167717 A1 | 6/2016 | Marchlewski et al. | B62D 33/0207 |
| 2016/0207441 A1 | 7/2016 | Khan | B60P 7/15 |

\* cited by examiner

MODULAR TRUCK BED MOUNTING APPARATUS AND KIT THEREFOR

CROSS REFERENCE TO RELATED APPLICATIONS

This US nonprovisional utility patent application is a continuation-in-part of and claims the benefit under 35 USC § 120 to co-pending U.S. application Ser. No. 15/598,250 filed May 17, 2017 and claims the benefit under 35 USC § 119(e) of U.S. provisional applications Nos. 62/508,761 and 62/508,779 both filed May 19, 2017, all of which are expressly incorporated herein in their entirety by this reference.

FIELD OF THE INVENTION

The present invention relates to mounting apparatuses, and in particular, to mounting apparatuses for use in removably mounting objects in truck beds, and kits therefor.

BACKGROUND OF THE INVENTION

Various means are known in the art for releasably mounting and securing objects in truck beds. However, such means have typically been awkward and cumbersome to mount and to release and/or take up a substantial amount of space in the truck bed. Examples of various mounting systems are disclosed in the following list of US patents and applications, all of which are expressly incorporated herein by reference: U.S. Pat. No. 5,971,685 to Owens, U.S. Pat. No. 6,675,980 to Ehrgott, U.S. Pat. No. 6,729,485 to Ehrgott, U.S. Pat. No. 8,028,845 to Himes, U.S. Pat. No. 8,439,612 to Chamoun, U.S. Pat. No. 8,690,503 to Chamoun, U.S. Pat. No. 9,346,392 to Neal, 20020117464 to Ehrgott, 20020117465 to Ehrgott, 20080185489 to Ehrgott, 20090120888 to Himes, 20120257943 to Chamoun, 20140360957 to Himes, 20160167717 to Marchlewski, and 20160207441 to Khan. Further, it is known to provide E-Track (see Appx A) and various spring E-fittings such as a spring E-fitting having a swivel ring (E-Track ring) (see Appx B). E-Track and various E-fittings are commercially available from a variety of sources such as Harbor Freight Tools.

SUMMARY OF THE INVENTION

The present invention is modular truck bed mounting apparatus and kit therefor. The apparatus comprises a length of E-track, a first tube, a plurality of second tubes, and a plurality of fasteners. The apparatus is preferably mounted to the head wall of a pickup truck bed and is useful in quickly and easily securing objects thereto.

DESCRIPTION OF DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
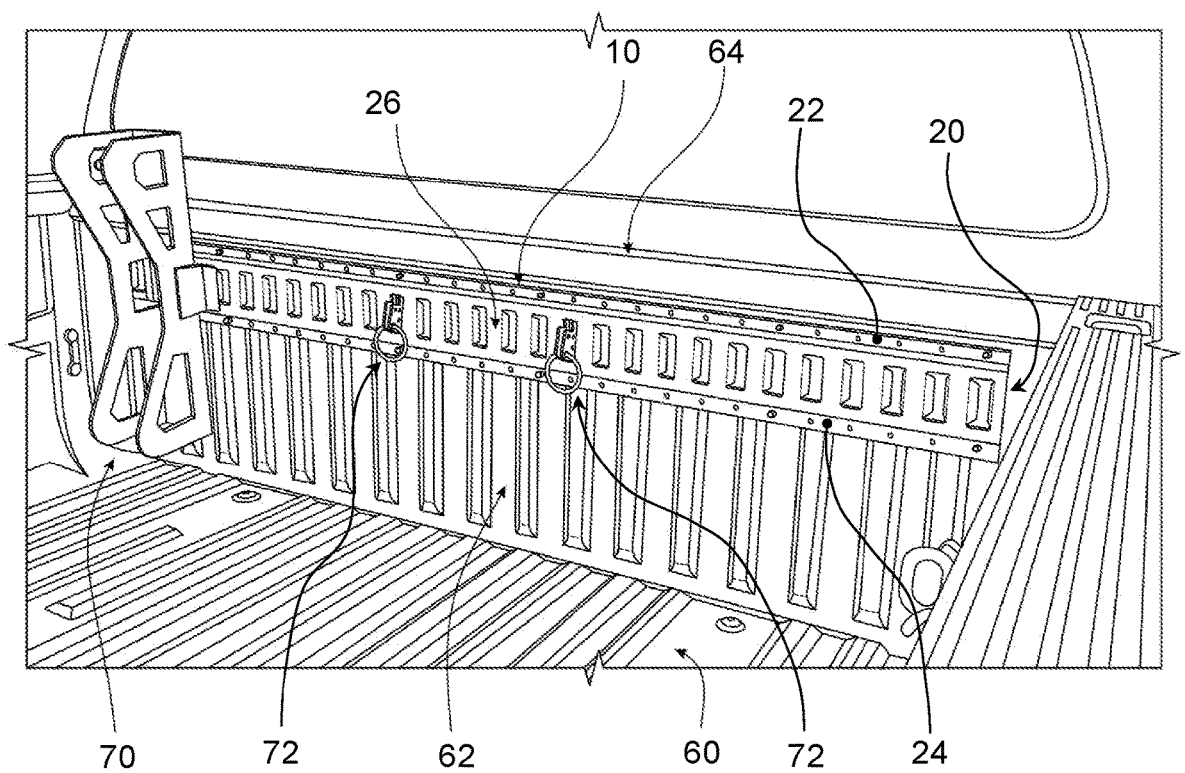
FIG. 1 is a trimetric view of the apparatus mounted to a pickup truck head wall.
Figure 2:
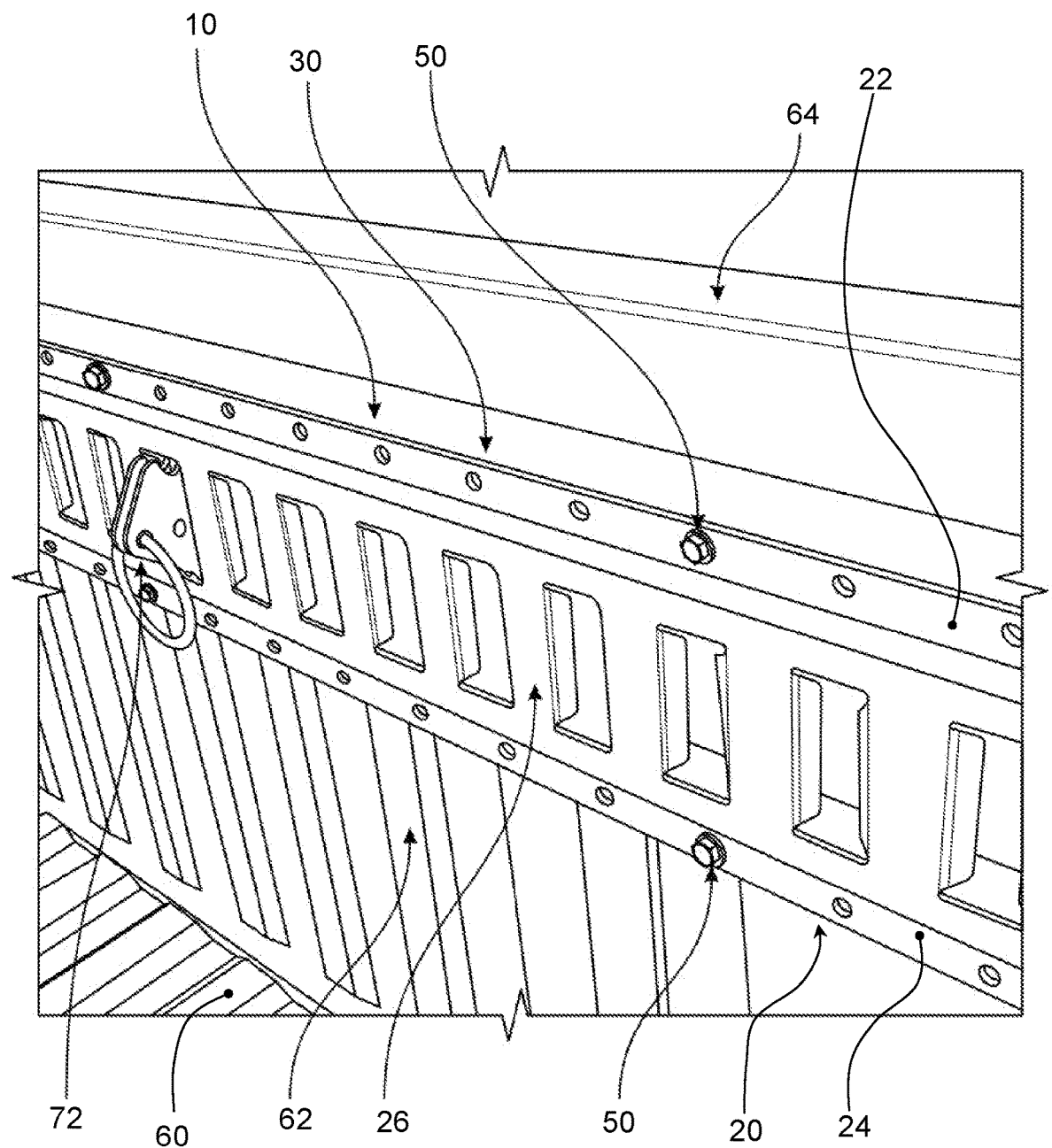
FIG. 2 is an enlarged trimetric view of the apparatus mounted to a pickup truck head wall.
Figure 3:
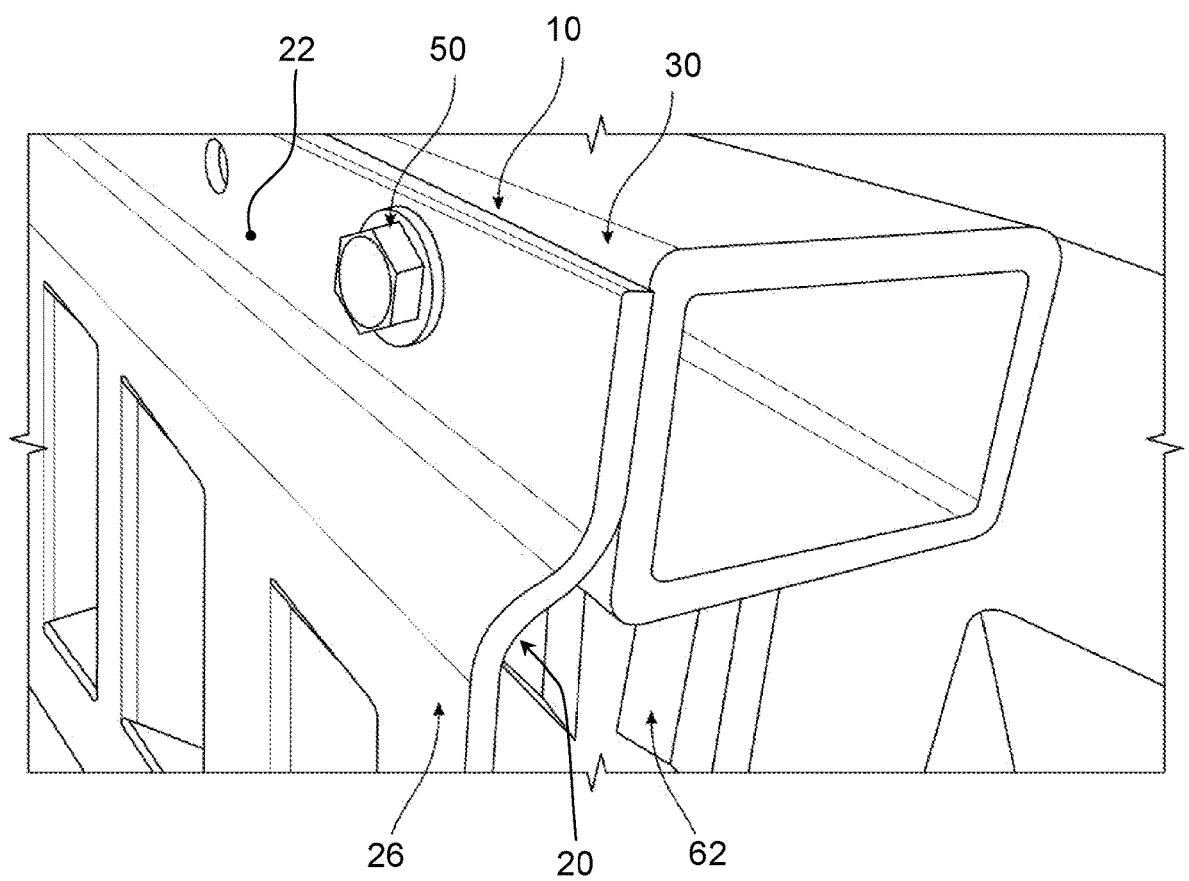
FIG. 3 is a trimetric view of an upper side end of the apparatus.
Figure 4:
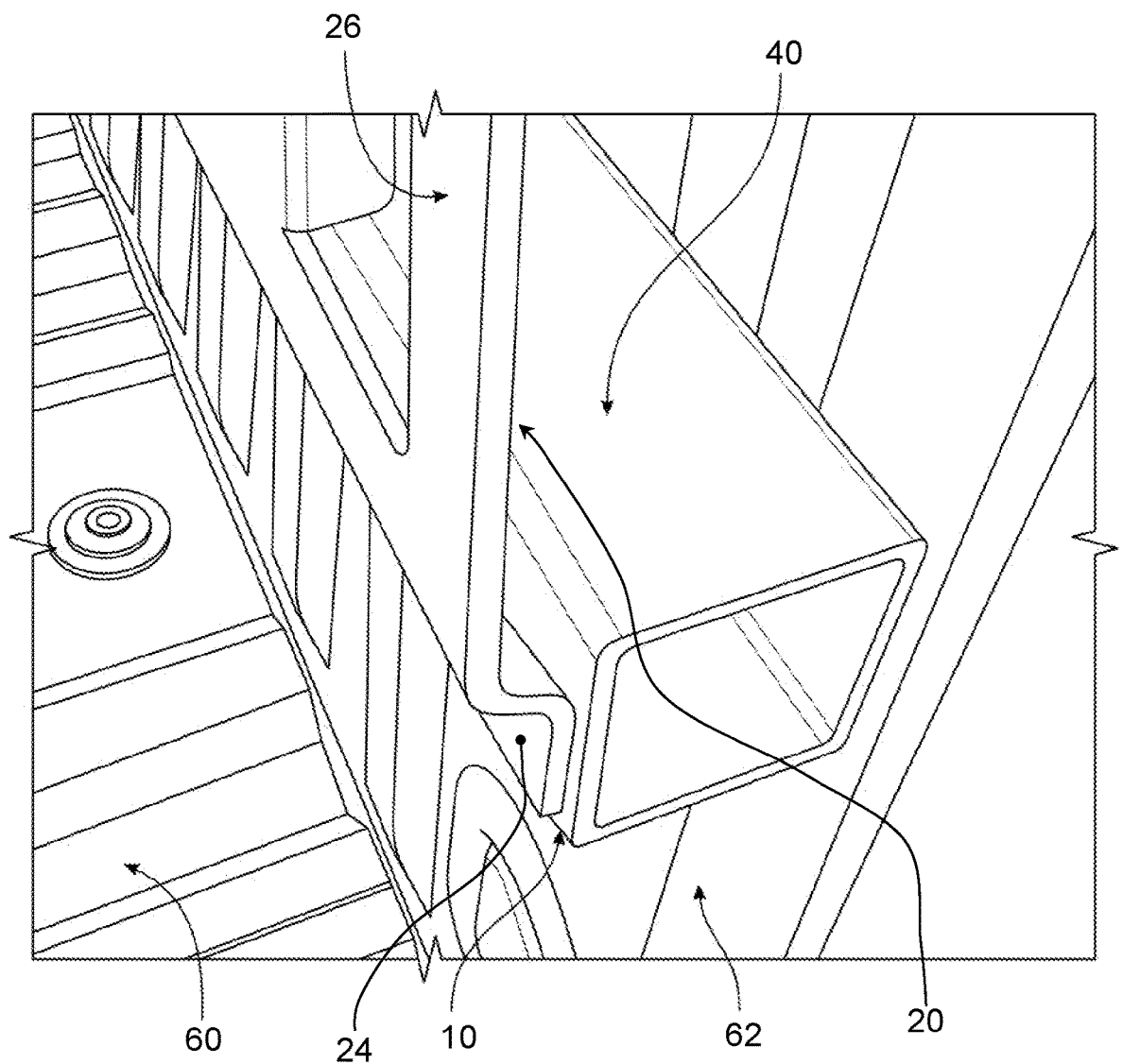
FIG. 4 is a trimetric view of a lower side end of the apparatus.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In order to facilitate the understanding of the present invention in reviewing the drawings accompanying the specification, a feature table is provided below. It is noted that like features are like numbered throughout all of the figures.

FEATURE TABLE

| #   | Feature                              | #   | Feature                             |
| --- | ------------------------------------ | --- | ----------------------------------- |
| 10  | Modular truck bed mounting apparatus | 20  | E-track                             |
| 22  | E-track upper flange                 | 24  | E-track lower flange                |
| 26  | E-track mount interface surface      | 30  | First tube                          |
| 40  | Second tubes                         | 50  | Fasteners                           |
| 60  | Truck bed                            | 62  | Truck bed head wall                 |
| 64  | Truck bed head rail                  | 70  | Spring E-fitting with a wheel chock |
| 72  | E-Track ring                         | 106 | Kit                                 |
| 108 | Instructions                         | 110 | Modular truck bed mounting apparatus |

Referring now to the drawings, a first embodiment the invention is a modular truck bed mounting apparatus 10 comprising a length of E-track 20 having an upper flange 22, a lower flange 24, and a mount interface surface 26, a first tube 30, a plurality of second tubes 40, and a plurality of fasteners 50. E-track 20 further defines a piece of E-track approximately five feet in length but may be longer or shorter than five feet. First tube 30 further preferably defines a hollow steel tube having cross-sectional dimensions of 1.0 inches×1.5 inches and being approximately five feet in length. Each second tube 40 further preferably defines a hollow steel tube having cross-sectional dimensions of 1.25 inches×1.25 inches and being approximately 12 inches in length. Each fastener 50 further preferably defines a steel fastener adapted to fastening sheet metal parts and having a grip length sufficient to pass through a flange of E-track 20, tube 20 or tube 40, and at least a portion of a bed head wall 62.

Modular truck bed mounting apparatus 10 is assembled such that first tube 30 is positioned against a truck bed head wall 62 below the head rail 64 of the truck bed 60 and substantially parallel to head rail 64. At least two second tubes 40 are positioned against truck bed head wall 62 below first tube 30 and substantially parallel to the head rail 64 preferably such that there is a gap of approximately 12 inches between a first instance of a second tube 40 and a second instance of a second tube 40. E-track 20 is positioned against first tube 30 and second tubes 40 such that upper flange 22 of E-track 20 is in faying contact with first tube 30 and such that lower flange 24 of E-track 20 is in faying contact with second tubes 40. With modular truck bed mounting apparatus 10 thus positioned, a plurality of fasteners 50 are fastened through the E-track flanges 22 and 24, the tubes 30 and 40, and into bed head wall 62. In a preferred embodiment, mount interface surface 26 of E-track 20 which is substantially parallel with bed head wall 62 either lies substantially in the same plane as the rearward surface of bed head rail 64 or may lie somewhat further aft of a truck cabin relative to head rail 64. The distance from the plane of rearward surface of bed head rail 64 and mount interface surface 26 may be for instance in the range of 0.25 inches to 6 inches and may specifically be for instance 1.0 inches. Such positioning of E-track 20 facilitates the unobstructed engagement of spring E-fittings which may be fastened to mounting objects that are substantially larger than such spring E-fittings such as a spring E-fitting with a wheel chock 70.

In an alternate embodiment, a modular truck bed mounting apparatus 110 comprising a length of E-track 20, a first tube 30, a plurality of second tubes 40, and a plurality of fasteners 50 is not assembled to a truck bed but is provided as a kit 106. In addition to modular truck bed mounting apparatus 110, kit 106 preferably includes assembly instructions 108 and may include one or more spring E-fittings of various configurations such as E-Track ring 72.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A modular truck bed mounting apparatus comprising a length of E-track having a mount interface surface and a plurality of flanges, a first tube, at least one second tube, and a plurality of fasteners, wherein said apparatus is fastened to a truck bed head wall such that said first tube is positioned between an upper flange of said plurality of flanges E-track and a first interface surface of said truck bed head wall and said second tube is positioned between a lower flange of said plurality of flanges E-track and a second interface surface of said truck bed head wall, and wherein said first interface surface of said truck bed head wall and said second interface surface of said truck bed head wall are non-coplanar and said E-track mount interface surface is substantially parallel to said truck bed head wall.

2. The apparatus of claim 1, wherein said mount interface surface of said E-track is positioned farther from a cab of said truck than a rearward most surface of a head rail of said truck bed head wall is positioned from said cab of said truck.

3. The apparatus of claim 1, wherein said first tube has cross-sectional dimensions that are dissimilar to cross-sectional dimensions of said at least one second tube.

4. The apparatus of claim 3, wherein said first tube has cross-section dimensions of substantially 1.0 inches×1.5 inches, and wherein said at least one second tube has cross-section dimensions of substantially 1.25 inches×1.25 inches.

5. The apparatus of claim 1, wherein said at least one second tube defines a plurality of second tubes, and wherein a gap exists between a first instance of a second tube of said plurality of second tubes and a second instance of a second tube of said plurality of second tubes, and wherein said gap defines a gap of substantially 12 inches.

6. The apparatus of claim 1, wherein said length said E-track is in the range of four feet to five feet long.

7. The apparatus of claim 1, wherein said apparatus includes at least one spring E-fitting loadingly and removably connected to said apparatus.

8. The apparatus of claim 7, wherein said at least one spring E-fitting defines at least one of a spring E-fitting having a wheel chock and an E-Track ring.

9. A modular truck bed mounting apparatus comprising a length of E-track having a mount interface surface and a plurality of flanges, a first tube, a plurality of second tubes, and a plurality of fasteners, wherein said apparatus is fastened to a truck bed head wall such that said first tube is positioned between an upper flange of said plurality of flanges E-track and said truck bed head wall and said plurality of second tubes are positioned between a lower flange of said plurality of flanges E-track and said truck bed head wall, and wherein said mount interface surface of said E-track is positioned farther from a cab of said truck than a rearward most surface of a head rail of said truck bed head wall is positioned from said cab of said truck.

10. The apparatus of claim 9, wherein said first tube has cross-sectional dimensions that are dissimilar to cross-sectional dimensions of said plurality of second tubes.

11. The apparatus of claim 10, wherein said first tube has cross-section dimensions of substantially 1.0 inches×1.5 inches, and wherein said plurality of second tubes have cross-section dimensions of substantially 1.25 inches×1.25 inches.

12. The apparatus of claim 9, wherein a gap exists between a first instance of a second tube of said plurality of second tubes and a second instance of a second tube of said plurality of second tubes, and wherein said gap defines a gap of substantially 12 inches.

13. The apparatus of claim 9, wherein said length of E-track is in the range of four feet to five feet long.

14. The apparatus of claim 9, wherein said apparatus includes at least one spring E-fitting loadingly and removably connected to said apparatus.

15. The apparatus of claim 14, wherein said at least one spring E-fitting defines at least one of a spring E-fitting having a wheel chock and an E-Track ring.

* * * * *